2,953,943

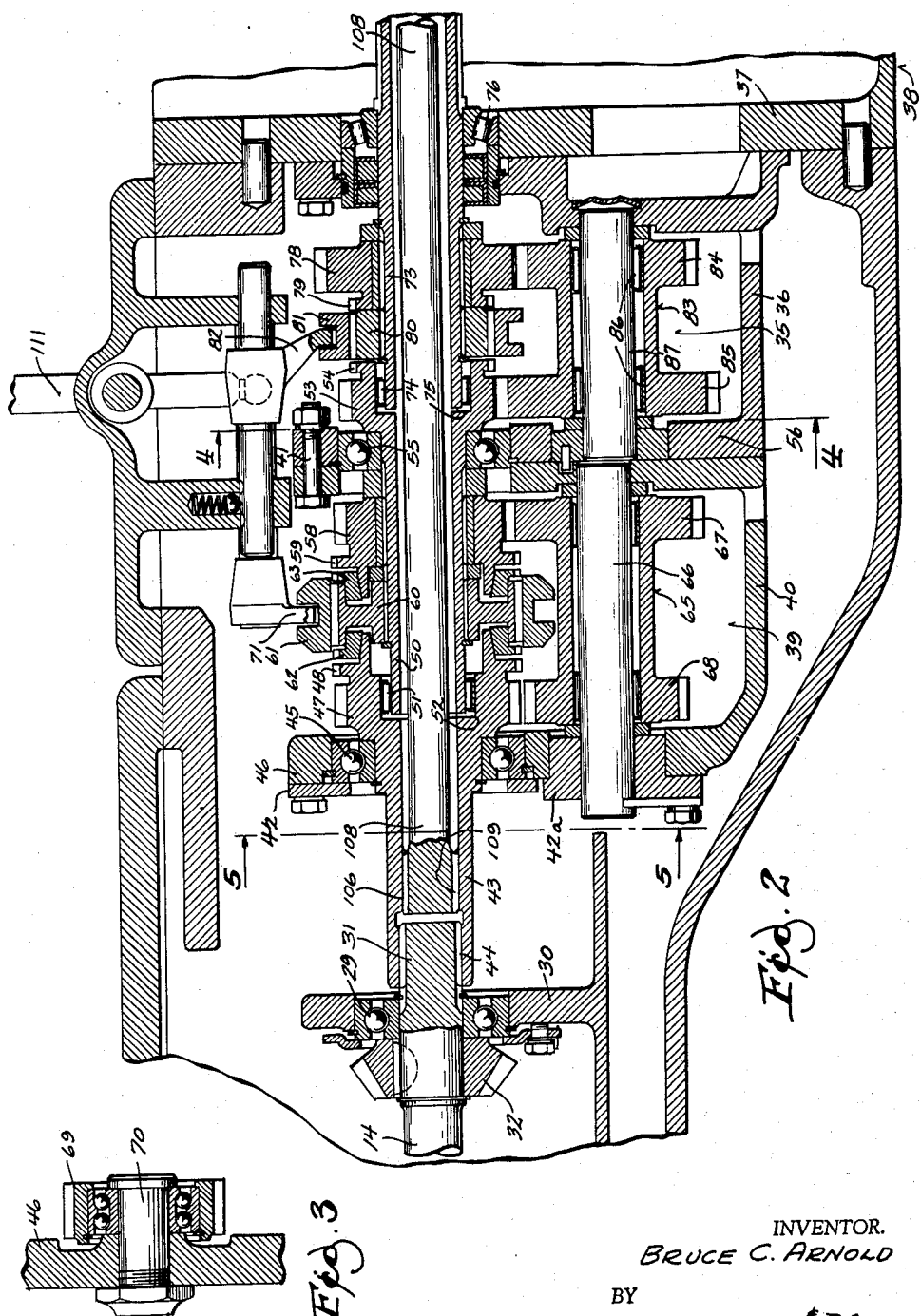

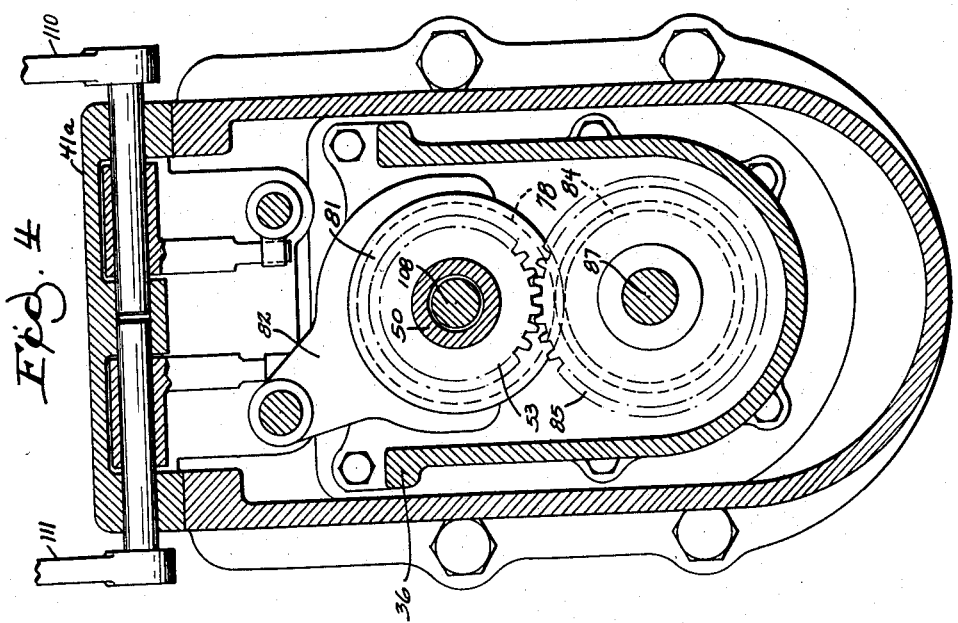
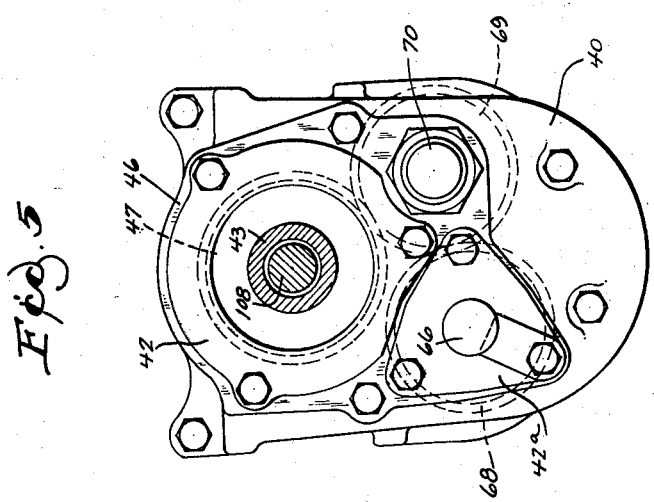
INVENTOR.
BRUCE C. ARNOLD
BY
Lieber, Lieber & Nilles
ATTORNEYS United States Patent Office 2,953,943
Patented Sept. 27, 1960

TRANSMISSION MECHANISM

Bruce C. Arnold, Rock Island, Ill., assignor to J. I. Case Company, Racine, Wis., a corporation of Wisconsin Filed Feb. 6, 1958, Ser. No. 713,643

8 Claims. (Cl. 74—745)

This invention relates to power transmission means and more particularly to reverse and range selection mechanisms therefor which find particular utility in tractors requiring frequent changes in speed and direction.

Modern tractors utilize implements which are either semi-mounted or fully supported by the tractor, and such tractors must be capable of operation over a wide range of speeds in either direction. These tractors must also provide a power take off shaft for operating the attached implements independently of ground speed travel.

As well as providing this complete flexibility of operation, these tractive vehicles must be compact in design and at the same time make provision for manufacturing economies by utilizing many parts which are common to other tractor model variations.

According to the present invention, a tractor transmission mechanism has been provided having the above-mentioned desirable characteristics.

The invention provides a particularly compact reversing and range selection mechanism by means of which a versatile tractor transmission is provided at a reasonable manufacturing cost.

The invention further contemplates a transmission of the above type which is simple and foolproof to operate, which features are particularly desirable when the tractor is used, for example, with a front end loader where the operator has various other controls to manipulate simultaneously with the operation of the tractor itself.

These and other objects and adantages of the invention will appear hereinafter as this disclosure progresses, reference being had to the accompanying drawings in which:

Figure 2 is a longitudinal cross-sectional view of the reversing and range selection means shown in Figure 1, but on an enlarged scale;

Figure 3 is a longitudinal cross-sectional view of the reverse idler gear;

Figure 4 is a transverse cross-sectional view, taken on line 4—4 of Figure 2, and showing the range selecting unit; and Figure 5 is a transverse view taken on line 5—5 of Figure 2, and showing the reversing unit.

Figure 1:
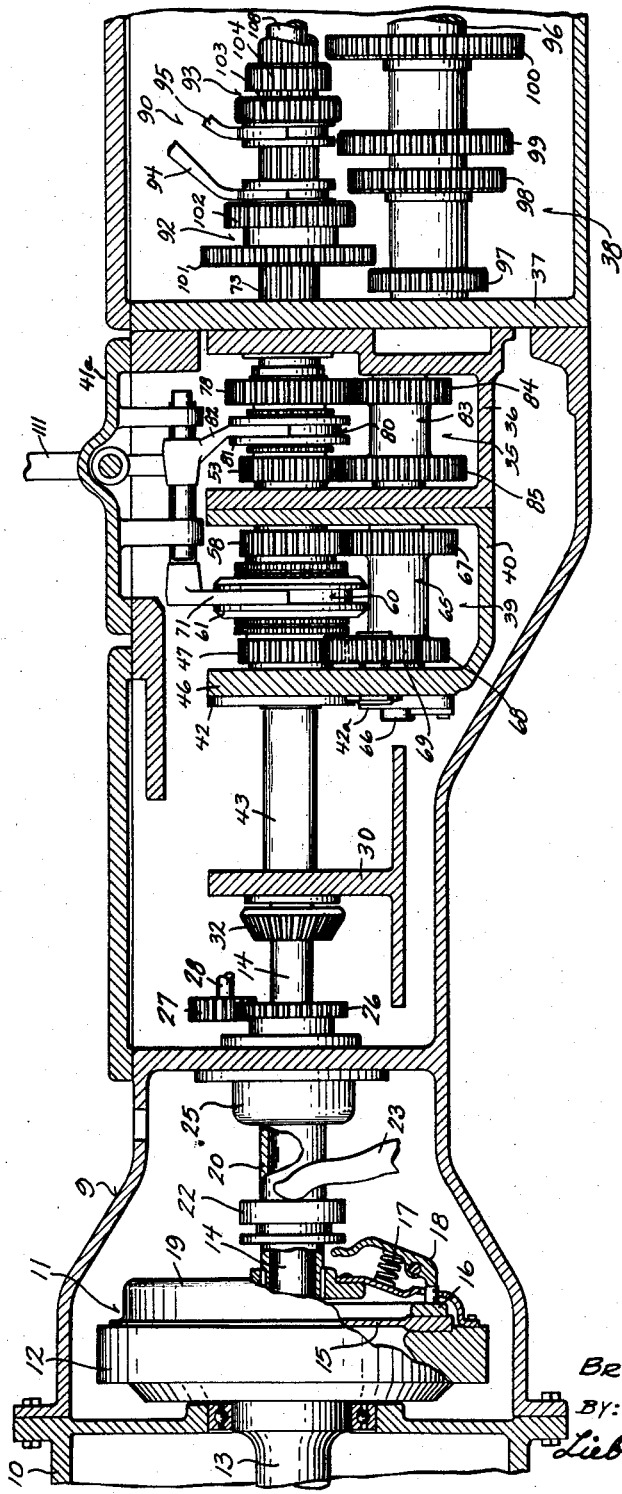
Figure 1 is a longitudinal view, partially in section, of a tractor body having a transmission embodying the invention, certain parts being broken away for clarity of the drawings.

Referring in greater detail to the drawings, and particularly Figure 1, the clutch housing 9 is secured to the internal-combustion engine 10 and contains the main clutch 11 including the flywheel 12 which is bolted to the engine crankshaft 13. A transmission power shaft 14 is piloted at its front end in the crankshaft and has a clutch disc 15 splined thereto. The disc 15 and its transmission shaft 14 are normally held in driving engagement with the flywheel by the pressure plate 16 which is biased to the engaged position by the circumferentially spaced springs 17 (only one shown) acting through their arms 18. Arms 18 are pivotally carried on the housing 19 which is bolted to the flywheel and splined to the hollow drive shaft 20. A collar 22 is slidably mounted on shaft 20 and is urged by the conventional shifting yoke 23 to swing the arms 18 against the action of their springs 17 and thereby withdraw the pressure plate from the clutch engaging position.

The yoke 23 is shifted by the tractor operator through a conventional clutch pedal (not shown) which, when depressed, disengages the main clutch 11 and thereby interrupts the drive to the transmission drive shaft 14.

The shaft 20 is rotatably supported in a bearing housing 25 carried by the body housing and terminates at its rear end in a gear portion 26. Gear 26 is in constant mesh with a gear 27 which through shaft 28 drives the tractor hydraulic pump (not shown) in the well known manner for operating the various hydraulically operated components of the tractor and its attached implements. Thus the shaft 20 is always driven and hydraulic power is therefore available as long as the tractor engine is running and irrespective of engagement or disengagement of clutch 11.

The rear end of the drive shaft 14 is rotatably supported in the anti-friction bearing assembly 29 in the housing wall 30 and terminates in an externally splined portion 31. A bevel gear 32 is keyed to shaft 14 for rotation thereby and is connected in the conventional manner to a belt pulley power-take-off shaft (not shown).

As shown on an enlarged scale in Figure 2, a speed range selection unit 35 is carried within its casing 36 which in turn is bolted to the front wall 37 of the speed change transmission housing 38. A reversing mechanism 39 is mounted within its casing 40 which is secured by bolt means 41 to the front side of the range selection casing 36. It will be noted that casings 36 and 40 are open at their top sides to provide convenient access thereto when the cover plate 41a of the tractor is removed. These units may be separately assembled with their component parts therein before the units themselves are placed within the tractor and bolted in place. To facilitate this assembly, removable cover plates 42 42a are secured to the front side of casing 40. Furthermore, these units may replace or be replaced by still other mechanism for accomplishing other functions.

The reversing mechanism includes a tubular input shaft 43 having an internal spline 44 by which it is drivingly connected to the shaft 14. The tubular shaft 43 is rotatably mounted in the anti-friction bearing assembly 45 carried by the front wall 46 of casing 40. The shaft has a gear 47 formed adjacent its rear end and terminates in a clutch element in the form of dental clutch teeth 48. Another tubular shaft 50 has its front end rotatably mounted on needle bearing assembly 51 located in a counterbore 52 in shaft 43. The rear end of shaft 50 also has a gear 53 formed thereon and terminates in a series of dental clutch teeth 54. Shaft 50 is rotatably supported in the anti-friction bearing assembly 55 carried by the front wall 56 of casing 36 and forms an input shaft to the range selector as will appear later.

A clutching gear 58 is freely rotatable on shaft 50 and has a series of dental clutch teeth 59 at forward side. A dental clutch 60 has a spline connection to shaft 50 and its axially shiftable selector collar 61, which is splined thereto, is drivingly engageable with either shaft 43 or gear 58. Balking rings 62 and 63 are disposed between the collar and gears 47 and 58, respectively, for synchronizing the speed of the clutch immediately prior to engagement.

A compound gear 65 is freely rotatable on shaft 66 which is carried in casing 40. The compound gear has a large gear element 67 formed integrally on one end and a smaller pinion gear 68 formed on its opposite end. It will be noted that the clutch 60 extends into the space between gears 67 and 68 thereby contributing to a compact unit.

A reverse idler gear 69 (Figs. 3 and 5) is freely rotatable on its shaft 70 which is rigidly secured in wall 46. This idler gear is in constant mesh with gears 47 and 68.

When the selector collar 61 is shifted by its yoke 71 to the left (as viewed in Fig. 2), a position of direct drive is obtained because input shaft 43 is then clutched directly to shaft 50. In this position the idler gear 69, compound gear 65 and gear 58 merely spin on their respective shafts without transmitting power.

When the selector collar 61 is shifted to the right, a position of reverse drive is obtained because power is then delivered from input shaft 43, through the reverse gear 69, compound gear 65, gear 58 and clutch 60 and out through the shaft 50. With the comparative dimensions of the gears as shown, the reverse speed of shaft 50 is about twenty-five percent faster than its forward speed.

Shaft 50 acts as the input shaft for the range selector unit 35 now to be described.

A tubular shaft 73 is rotatably mounted in the needle bearing assembly 74 mounted in counterbore 75 of shaft 50 and is also supported in the thrust bearing assembly 76 carried in the front wall 37 of the speed change gear housing 38. A bearing assembly (not shown) which is similar to assembly 76, is located at the right end of shaft 73 to help support the latter.

A clutching gear 78 is freely rotatable but axially fixed on shaft 73 and has dental clutch teeth 79 opposed to the dental clutch teeth 54 of shaft 50. A dental clutch 80 is located between the shaft 50 and gear 78 and its selector collar 81 is selectively engageable therewith, as determined by the shifter yoke 82.

The range selector unit 35 also includes a compound gear 83 having a small gear element 84 and larger gear element 85 formed integrally therewith. Gear 83 is mounted on the anti-friction needle bearings 86 carried on shaft 87, which in turn, is held captive in casing 36.

When the selector collar 81 is shifted to the left (Fig. 2) by yoke 82, a direct drive or "normal" range is provided, the power from shaft 50 being delivered via its gear 53, collar 81 and out through tubular shaft 73. When collar 81 is shifted to the right, the power train is from shaft 50, through gears 53, 83 and 78, clutch 80 and out through shaft 73.

Shaft 73 constitutes an input shaft to the change speed gear unit 90 located in the transmission housing 38. This change speed gear box is of the four speed type by means of which any one of four speed ratios may be selected therefrom and other number of speed ratios may be employed. That portion of shaft 73 which extends into housing 38 is splined for driving engagement of the two compound gears 92 and 93. Cluster 92 is slidable by its shifting yoke 94 and cluster 93 is slidable by its yoke 95. The output shaft 96 is rotatably mounted in housing 38 and is connected at its rear end with the differential (not shown) or other final drive mechanism of the tractive vehicle for furnishing power to the ground engaging wheels. The output shaft has four gears 97, 98, 99 and 100 fixed thereto for selective meshing with gear elements 101, 102, 103 or 104, respectively, thus providing four different speeds.

It will be noted that the sleeve-like shafts 43, 50 and 73 are all hollow and act as power input shafts to the reversing unit, range selector unit and speed change unit, respectively. Shafts 50 and 73 are partially rotatably supported in shafts 43 and 50, respectively, which design contributes to a compact arrangement.

The shaft 43 has a second internal spline 106 at its forward end. A power-take-off shaft 108 having an external spline 109 engages spline 106 and extends through the hollow input shafts. With this construction, a power-take-off shaft is provided which is capable of furnishing power to an attached implement or the like, whenever the engine is running and independently of engagement of the dental clutches, or direction or speed of the output transmission shaft. The take-off shaft can be easily inserted in the otherwise assembled transmission by inserting it in through the rear end of shaft 73.

The reversing unit 39 is located ahead of the normal low speed range unit 35 and the four speed gear change unit is located to the rear of both. The arrangement is such as to provide a total of eight speeds in either a forward or reverse direction, utilizing a comparatively small space both in transverse and axial directions.

Shift levers 110 and 111 are provided for the reversing unit and range selector unit, respectively, and are each shiftable in a simple straight line motion from one of their positions to the other. Thus a simple fore and aft motion on the proper lever will effect forward or reverse of the tractor or a selection of direct or low speed range.

The arrangement and construction of the range selector and reversing units and their casings provide an easily assembled transmission and one which can be converted with minor changes to provide different numbers of speeds for various other models of tractors.

Both of the casings 36 and 40 are sub-assembled separately. Then in final assembly the range selector unit 36 is fastened to the main transmission case 38. Next the reverse assembly is mounted on casing 36 by sliding gear 53 through the large bore in the front wall of casing 40 and into mesh with gear 85, and sliding bearing 55 into its seat in casing 36. When this has been done, both casings 36 and 40 are piloted by the outside diameter of bearing 55 to insure proper alignment. Tightening bolts 41 then completes this portion of the assembly operation.

With slight modification to the parts, it is possible to use either the range selector or reverse unit without the other, in other tractor models, if desired. For example, the reverse unit 36 could be omitted and the range selector mechanism 40 could be used in conjunction with the change speed transmission 90. The latter would then utilize the reverse mechanism shown in the above mentioned application. Such an arrangement would then give eight speeds forward and two reverse.

Alternatively, the range selector unit 36 can be left out of the present arrangement to give four speeds forward and four in reverse.

Thus complete flexibility of functions and manufacturing economies are provided.

Various modes of carrying out the invention are contemplated as being within the scope of the following claims particularly pointing out and distinctly claiming the subject matter which is regarded as the invention.

I claim:

1. In a tractor having a housing, a reverse and range selector mechanism for a speed change transmission comprising, a first support casing within said housing, an input shaft rotatably mounted in said first support casing and having means at one end for detachable connection to a power source, a second support casing secured to said first casing and supported by said housing, a range selector shaft rotatably mounted in said input shaft and in said second casing, a clutch member fixed to said range selector shaft, reverse gear means in said first casing and in constant driven relation with said input shaft, said clutch member having a shiftable part engageable with said input shaft or said reverse gear means to thereby rotate said range selector shaft in either direction, a speed change transmission shaft rotatably mounted in said selector shaft and in said second casing, a second clutch member fixed to said transmission shaft for rotation therewith, and range selector gearing in constant driven relation with said selector shaft, said second clutch member having a shiftable part engageable with said selector shaft or said range selector gearing to thereby rotate said transmission shaft at different speeds.

2. In a transmission and power take-off system for a tractive vehicle, the combination comprising; reverse gearing means, range selector means and transmission speed change means; first, second and third coaxially arranged shafts rotatably mounted in said vehicle and constituting power input shafts for said reverse gear means, range selector means and speed change means, respectively; a clutch member carried on said second shaft and having a shiftable part engageable with said first shaft either directly or through said reverse gear means; and a second clutch member carried by said third shaft and having a shiftable part selectively engageable with said second shaft or said range selector means whereby said third shaft is rotatable to drive said transmission speed change means in either direction and selectively at one of two speeds.

3. In a tractive vehicle having a speed change transmission housing, the combination comprising, a first casing secured to said housing and having range selector means therein, a second casing secured to said first casing and having reverse mechanism therein, a driven power input shaft extending into said second casing and engageable with said reverse mechanism, a range selector shaft extending from said second casing into said first casing, clutch means rotatable with said selector shaft and having a shiftable part selectively engageable with said input shaft or with said reverse mechanism to thereby rotate said selector shaft in either direction, a transmission shaft extending from said first casing into said transmission housing, and second clutch means rotatable with said transmission shaft and having a shiftable part selectively engageable with said selector shaft or with said selector means whereby said transmission shaft is rotated for transmitting power in different directions and ranges to speed change gearing located in said housing.

4. A reverse and range selector mechanism for a speed change transmission comprising, an input shaft having means at one end for detachable connection to a power source and having a gear and a clutch element adjacent to its other end, a reverse gear mounted for constant connection with said input shaft gear, a range selector shaft rotatably mounted in co-axial relation to said input shaft and having a clutch element and a gear fixed adjacent one end thereof, a clutch fixed to said range selector shaft for rotation therewith and having a shiftable part, a clutching gear freely rotatable on said selector shaft and in constant engagement with said reverse gear, said shiftable part being engageable either with said input shaft clutch element or with said clutching gear and consequently with said reverse gear to thereby rotate said range selector shaft in either direction, a transmission shaft rotatably mounted in co-axial relation to said selector shaft and having a clutching gear freely rotatable thereon, a change speed transmission driven by said transmission shaft, a second clutch fixed to said transmission shaft for rotation therewith and having a shiftable part, and range selector gearing in constant mesh with said selector shaft gear and transmission shaft clutching gear, said second clutch shiftable part being engageable either with said selector shaft clutch element or with said transmission shaft clutching gear to thereby rotate said transmission selectively at different speeds.

5. In a tractor of the type having an engine and traction means, the combination of a frame portion comprising a tubular element connected at one end to said engine, a main speed change gear housing having a front wall fixed to the other end of said tubular element, a power transmitting shaft means driven by said engine and extending through said tubular element and said front wall into said speed change gear housing, a separate auxiliary speed change gear casing fixed in relation to said front wall and projecting into said tubular element, speed change gears in said auxiliary speed change gear casing, interposed in said shaft means and constituted to effect a reduction of speed in said shaft means where it enters said main speed change gear housing, said speed change gears being shiftable into another position operative to effect a drive into said main speed change gear housing at the same speed as said engine, and a reversing mechanism casing fixed to said auxiliary speed change gear casing and projecting into said tubular element, there being reversing gearing in said reversing mechanism casing also interposed in said shaft means and constituted to reverse the rotation of said shaft means where it enters said auxiliary speed change casing, and said reversing gearing being shiftable into another position operative to effect a drive into said auxiliary speed change casing in the same direction and at the same speed as said engine.

6. In a tractor of the type having an engine and traction means, the combination of a frame portion comprising a tubular element connected at one end to said engine and having at its other end a rearwardly flared portion, a relatively larger main speed change gear housing having a front wall fixed to said other end of said tubular element, a power transmitting shaft means driven by said engine and extending through said tubular element and said front wall into said speed change gear housing, a separate auxiliary speed change gear casing fixed in relation to said front wall and projecting into said flared portion of said tubular element, speed change gears in said auxiliary speed change gear casing, interposed in said shaft means and constituted to effect an alteration of speed in said shaft means where it enters said main speed change gear housing, said speed change gears being shiftable into another position operative to effect a drive into said main speed change gear housing at the same speed as said engine, and a reversing mechanism casing fixed to said auxiliary speed change gear casing and projecting into said flared portion of said tubular element, there being reversing gearing in said reversing mechanism casing also interposed in said shaft means and constituted to reverse the rotation of said shaft means where it enters said auxiliary speed change casing, and said reversing gearing being shiftable into another position operative to effect a drive into said auxiliary speed change casing in the same direction and at the same speed as said engine.

7. In a tractor of the type having an engine and traction means, the combination of a frame portion comprising a tubular element connected at one end to said engine, a main speed change gear housing having a front wall fixed to the other end of said tubular element, a power transmitting shaft means driven by said engine and extending through said tubular element and said front wall into said speed change gear housing, a reversing mechanism casing fixed in relation to said main speed change gear housing and projecting into said tubular element, reversing gearing in said reversing mechanism casing interposed in said shaft means and constituted to reverse the rotation of said shaft means and drive it at an increased rate of speed where it enters said main speed change gear housing, said reversing gearing being shiftable into another position operative to effect a drive into said main speed change gear housing at the same speed as said engine, and in the same direction.

8. In a tractor of the type having an engine and traction means, the combination of a frame portion comprising a tubular element connected at one end to said engine, a main speed change gear housing having a front wall fixed to the other end of said tubular element, a power transmitting input shaft driven by said engine and extending through said tubular element, a reversing mechanism casing fixed in relation to said main speed change gear housing and projecting into said tubular element, an output shaft rotatably mounted in said reversing mechanism casing, a clutch member fixed to said output shaft, reverse gear means in said reversing mechanism casing in constant driven relation with said input shaft, said clutch member having a shiftable part engagable with said input shaft for rotating it in one direction, synchronizing means interposed between said shiftable part and said input shaft, and said shiftable part being shiftable into another position engaging said reverse gear means to thereby rotate said output shaft in the other direction, and synchronizing means interposed between said shiftable part and said reverse gear means.

References Cited in the file of this patent

UNITED STATES PATENTS

| | | |
|---|---|---|
| 1,136,279 | Servery | Apr. 20, 1915 |
| 2,637,221 | Backus et al. | May 5, 1953 |
| 2,699,689 | Ahlen | Jan. 18, 1955 |
| 2,777,332 | Nallinger | Jan. 13, 1957 |

FOREIGN PATENTS

| | | |
|---|---|---|
| 884,139 | Germany | July 23, 1953 |